US008612631B2

(12) United States Patent
Matsumoto

(10) Patent No.: US 8,612,631 B2
(45) Date of Patent: Dec. 17, 2013

(54) CONTROL APPARATUS INCLUDING DETACHABLE KEYPAD WITH COMMUNICATION PORT CONNECTING PERSONAL COMPUTER TO THE KEYPAD

(75) Inventor: Yoshihiro Matsumoto, Mie (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 11/677,771

(22) Filed: Feb. 22, 2007

(65) Prior Publication Data

US 2007/0203590 A1   Aug. 30, 2007

(30) Foreign Application Priority Data

Feb. 24, 2006   (JP) ................................. 2006-049318

(51) Int. Cl.
*G06F 3/00* (2006.01)
*G06F 13/38* (2006.01)
*G06F 15/177* (2006.01)

(52) U.S. Cl.
USPC ...................................... 710/2; 710/62; 713/1

(58) Field of Classification Search
None
See application file for complete search history.

(56) References Cited

U.S. PATENT DOCUMENTS

| 5,579,487 | A | * | 11/1996 | Meyerson et al. | ............ | 710/100 |
| 5,664,228 | A | * | 9/1997 | Mital | ............... | 710/62 |
| 5,666,256 | A | * | 9/1997 | Zavis et al. | .................... | 361/115 |
| 5,754,227 | A | * | 5/1998 | Fukuoka | ..................... | 348/231.6 |
| 5,822,230 | A | * | 10/1998 | Kikinis et al. | ................. | 708/109 |
| 6,335,870 | B1 | | 1/2002 | Sakurai | | |
| 6,498,965 | B2 | * | 12/2002 | Matsumoto et al. | .......... | 700/231 |
| 6,546,262 | B1 | * | 4/2003 | Freadman | ..................... | 455/557 |
| 7,061,477 | B1 | * | 6/2006 | Noguchi | ........................ | 345/204 |
| 7,620,565 | B2 | * | 11/2009 | Abelow | ........................ | 705/7.32 |
| 7,746,629 | B2 | * | 6/2010 | Assouad et al. | ........ | 361/679.31 |
| 2003/0059038 | A1 | * | 3/2003 | Meyerson et al. | ........ | 379/428.04 |
| 2003/0182456 | A1 | * | 9/2003 | Lin et al. | ........................ | 709/250 |
| 2004/0037420 | A1 | * | 2/2004 | Brieskorn | ..................... | 379/419 |
| 2004/0088452 | A1 | * | 5/2004 | Scott | ................................ | 710/62 |
| 2004/0223293 | A1 | * | 11/2004 | Nakano et al. | ................ | 361/679 |

(Continued)

FOREIGN PATENT DOCUMENTS

| JP | 64-026393 A | 1/1989 |
| JP | 08-251934 A | 9/1996 |

(Continued)

OTHER PUBLICATIONS

Office Action issued on Oct. 31, 2008 in corresponding Chinese patent application No. 200710085209.2.

(Continued)

*Primary Examiner* — Henry Tsai
*Assistant Examiner* — Michael Sun
(74) *Attorney, Agent, or Firm* — Rossi, Kimms & McDowell LLP

(57) ABSTRACT

The control apparatus according to the invention includes a keypad detachable from the control apparatus and including a communication device that facilitates communicating with a personal computer such that the keypad detached from the control apparatus is connected to the personal computer for setting the operations of the control apparatus and, then, the keypad is attached to the control apparatus to make the control apparatus conduct the control operations based on the setting contents set in the keypad. The control apparatus according to the invention facilitates setting the operations thereof in any place different from the place, therein the control apparatus is installed, and reducing the electric power fed to the control apparatus during the setting operation.

11 Claims, 3 Drawing Sheets

(56) References Cited

U.S. PATENT DOCUMENTS

| | | | |
|---|---|---|---|
| 2004/0229648 A1* | 11/2004 | Yamamoto et al. | 455/557 |
| 2005/0040250 A1* | 2/2005 | Wruck | 236/51 |
| 2005/0134248 A1* | 6/2005 | Locker et al. | 323/285 |
| 2005/0160223 A1* | 7/2005 | Chen et al. | 711/115 |
| 2005/0190399 A1* | 9/2005 | Nakaoka et al. | 358/1.15 |
| 2006/0173980 A1* | 8/2006 | Kobayashi et al. | 709/222 |
| 2007/0139943 A1* | 6/2007 | Bone et al. | 362/488 |

FOREIGN PATENT DOCUMENTS

| | | |
|---|---|---|
| JP | 2000-139080 A | 5/2000 |
| WO | 00/04629 | 1/2000 |
| WO | 00/04629 A1 | 1/2000 |
| WO | 2006-125405 A2 | 11/2006 |

OTHER PUBLICATIONS

Office Action, dated Jun. 5, 2009, issued in the corresponding Chinese Patent Application No. 2007/10085209.2.

Japanese Office Action corresponding to JP 2006-049318 dated Jun. 14, 2011. Partial translation of "Notification of Reasons for Refusal" provided.

Notification of Reasons for Refusal for corresponding JP 2006-049318, mail date Jan. 24, 2012. Partial translation provided.

* cited by examiner

CONTROL APPARATUS INCLUDING DETACHABLE KEYPAD WITH COMMUNICATION PORT CONNECTING PERSONAL COMPUTER TO THE KEYPAD

FIELD OF THE INVENTION

The present invention relates to an inverter and such a control apparatus connectable to a personal computer (hereinafter referred to as a "PC"). Specifically, the present invention relates to a control apparatus provided with a keypad detachable therefrom.

BACKGROUND OF THE INVENTION

The conventional control apparatus such as an inverter has a configuration as disclosed in International Patent Application Publication No. WO 00/004629 (Unexamined Laid Open Japanese Patent Application Hei. 11 (1999)-544513). FIG. 4 is a block diagram showing the configuration of conventional inverter 41.

Referring now to FIG. 4, inverter 41 is connected to a three-phase AC electric power supply 42. Inverter 41 includes a converter section 43 that converts the AC electric power fed from the AC electric power supply 42 to DC electric power, a smoothing capacitor 44 that smoothes the DC electric power, and an inverter section 45 that converts the smoothed DC electric power to AC electric power, wherein the frequency and the voltage thereof are variable. Inverter 41 includes, as the main control means thereof, a CPU 46 which works as an operating means that controls the converter section 43 and the inverter section 45, a memory 47 comprised of a RAM, memory 48 working as a first storage section that stores the basic program for controlling the inverter 41, an application software storage section 49 working as a second storage section that stores the application programs for controlling the inverter 41, a parameter storage section 50 that stores the parameters set based on the driving specifications of the inverter, and a display section 51 that displays the driving status of the inverter or the states of parameter settings. Personal computer (PC) 52 is connected to CPU 46 via a communication means to transfer the application software and various parameter values, necessary for making the inverter 41 conduct the intended operations, from the outside of the inverter to memory 48 and to write therein the transferred application software and the parameter values so that the inverter 41 may be controlled meeting various specifications.

It is possible to designate the operations of conventional inverter 41 using a data processing apparatus such as a PC so that the operations thereof may meet various specifications and targets. However, for setting the control program and such programs in the inverter, it is necessary to connect a PC to the inverter, to operate the PC, and to set the control program and such programs in the PC in the place, wherein the inverter is installed, even if the place is not suited for operating the PC. Moreover, it is also necessary to feed electric power to the entire inverter in setting the control program and such programs therein.

In view of the foregoing, it would be desirable to provide a control apparatus such as an inverter that facilitates conducting the setting operation thereof in a place different from the place where the control apparatus is installed. It would be also desirable to provide a control apparatus that facilitates reducing the electric power fed to the entire control apparatus in conducting the setting operation thereof.

SUMMARY OF THE INVENTION

For obviating the problems described above, the control apparatus such as an inverter according to the invention includes a detachable keypad including a communication device that facilitates communicating between the keypad and a PC. The control apparatus according to the invention makes it possible for the manager of the installations such as the control apparatus to change the settings of the operation specifications from the keypad connected to the PC in a different place different from the place, therein the control apparatus is installed and, then, to return the keypad to the control apparatus so that the control apparatus may conduct the control operations thereof based on the new settings. Since it is possible to conduct the setting operation in the different place suited for conducting the setting operation, the setting operation efficiency is improved, even if the control apparatus is installed in the circumstance not suited for operating the PC. Although it has been necessary to feed an electric power supply to the entire control apparatus during the setting operation of the conventional control apparatus, it is not necessary to feed the electric power supply to the entire control apparatus during the setting operation according to the invention. Moreover, since the keypad is structured such that a power supply is fed from the PC to the keypad according to the invention, it is not necessary for the keypad to have any special power supply equipment such as a power supply plug.

According to an aspect of the invention, there is provided a control apparatus connectable to a PC, the control apparatus facilitating conducting the settings relevant to the operations thereof from the PC connected thereto, the control apparatus including: a keypad detachable from the control apparatus, the keypad including a communication device connectable to the PC. Advantageously, the keypad includes a storage device that stores data relevant to the operations of the control apparatus, the data including parameter values and programs, wherein the keypad is detached from the control apparatus and connected to the PC to renew the data, including the parameter values and the programs relevant to the operations of the control apparatus and stored in the storage device. The keypad is returned to the control apparatus to transfer the data including the parameter values and the programs relevant to the operations of the control apparatus to the storage device of the control apparatus. The control apparatus according to the invention makes it possible for the installation manager to detach the keypad from the inverter and to conduct the setting operation in the place suited for conducting the setting operation. Since it is not necessary to feed an electric power supply from the PC to the entire control apparatus, the electric power consumption during the setting operation is reduced.

Advantageously, the communication device includes a function of testing whether the communication between the PC and the keypad is normal or not. The provision of the testing function makes it possible to conduct the communication between the PC and the keypad always normally.

Advantageously, the storage device of the keypad is capable of storing the data including the parameter values and the programs relevant to the operations of a plurality of control apparatuses. The data storage relevant to the operations of a plurality of control apparatuses makes it possible to conduct the setting operations for the control apparatuses collectively. After the collective data storage is over, the keypad is attached to the control apparatuses one by one so that the control apparatuses may conduct control operations based on the respective data.

Advantageously, the communication device is capable of exchanging data between the PC and the keypad and feeding an electric power supply from the PC to the keypad. The communication device described above facilitates eliminating the power supply plug and such special power supply equipments and functions from the keypad.

The control apparatus including the keypad according to the invention makes it possible for the manager of the installations such as an inverter, in renewing the operation specification settings of the control apparatus, to detach the keypad from the inverter, to conduct the setting operation in a place suited for conducting the setting operation, and to return the keypad to the control apparatus so that the control apparatus may conduct control operations based the renewed operation specifications. When the PC and the keypad are connected to each other to conduct the setting operation, the control apparatus according to the invention makes it unnecessary to feed electric power from the PC to the entire control apparatus. The electric power feed from the PC to the keypad via the communication means thereof makes it possible to eliminate the power supply plug and such special power supply equipments and functions from the keypad.

DESCRIPTION OF SPECIFIC EMBODIMENTS

The invention will now be described in detail hereinafter with reference to the accompanied drawings which illustrate the specific embodiments of the invention.

Although the invention will be described in connection with an inverter, the invention is applicable to the control apparatuses having the problems similar to those to be obviated by the present invention.

Figure 1:
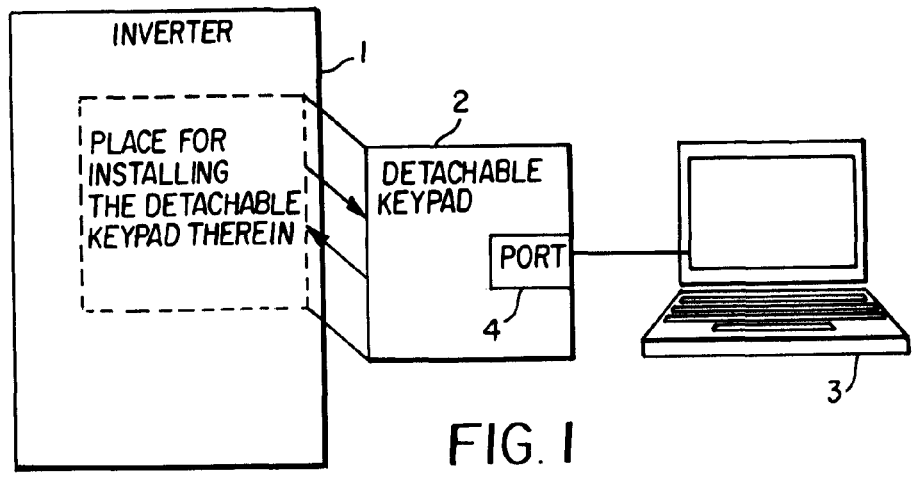
FIG. 1 is a block diagram describing the configuration of a control apparatus according to the invention.

FIG. 1 is a block diagram describing the configuration of the control apparatus according to the invention. Referring now to FIG. 1, inverter 1 includes a detachable keypad 2 detachable from inverter 1. Inverter 1 has a place enclosed by the broken lines as shown in FIG. 1, therein keypad 2 is installed. A connector and as such a connecting means are installed in the place for inserting keypad 2 thereto. FIG. 1 shows keypad 2 detached from inverter 1.

Detachable keypad 2 includes a communication port 4 for connecting a personal computer (PC) thereto. Detachable keypad 2 is connected to personal computer (PC) 3 via communication port 4. Communication port 4 is realized, for example, by a universal serial bus (hereinafter referred to as a "USB") although other types of communication ports and devices (both wired and wireless) may be employed. According the USB communication specification, it is possible to feed an electric power supply from a PC to the equipment connected to the PC. In other words, when PC 3 and keypad 2 are connected to each other, an electric power supply is fed from PC 3 to keypad 2. The communication between PC 3 and keypad 2 via communication port 4 is provided with the function of testing whether the communication is normal or not.

Now the steps conducted by the user for setting the operations of inverter 1 will be described below in the conducted order and with reference to FIGS. 2(a) through 3(c).

Figure 2A:
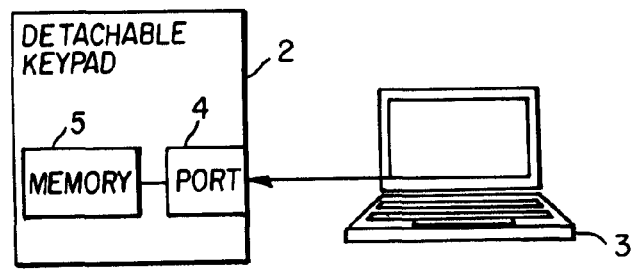
FIG. 2(a) is a block diagram describing the operation writing the settings of an inverter into the memory of a keypad from a PC connected to the keypad.
Figure 2B:
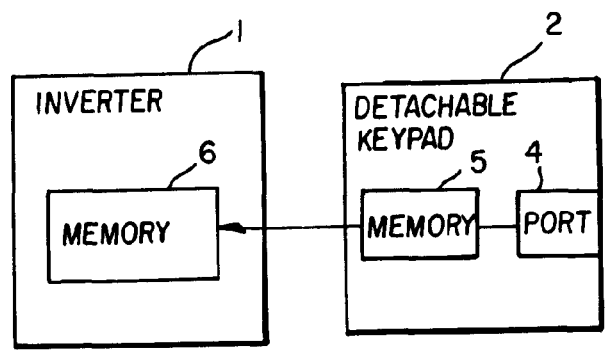
FIG. 2(b) is a block diagram describing the operation writing the settings of the inverter into the memory thereof from the keypad connected to the inverter.
Figure 3A:
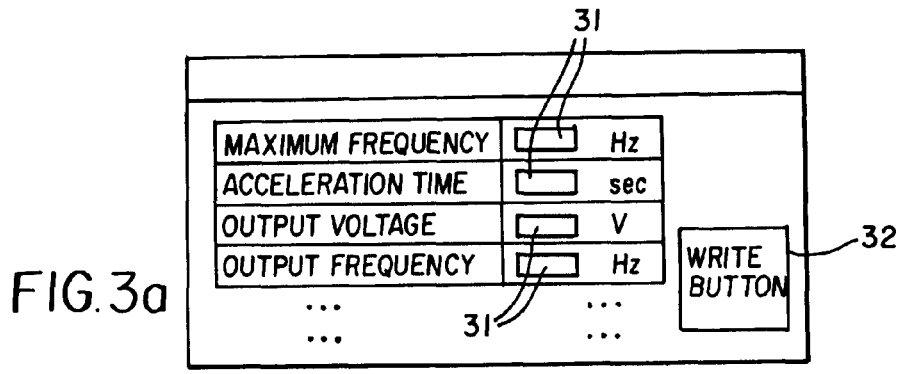
FIG. 3(a) schematically shows a screen on the PC displaying an example of settings.
Figure 3B:
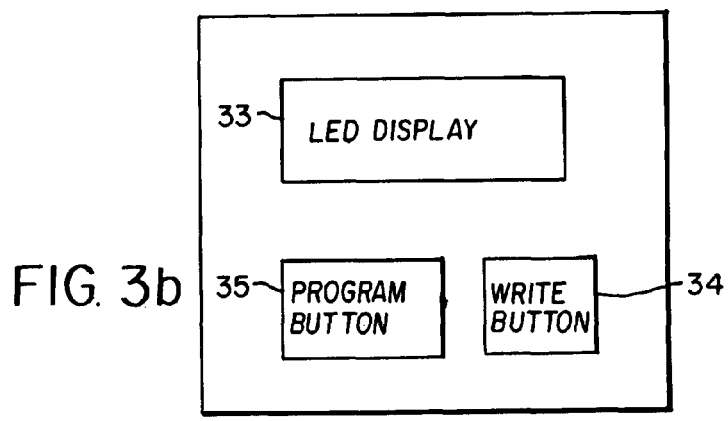
FIG. 3(b) schematically shows the external appearance of the keypad.
Figure 3C:
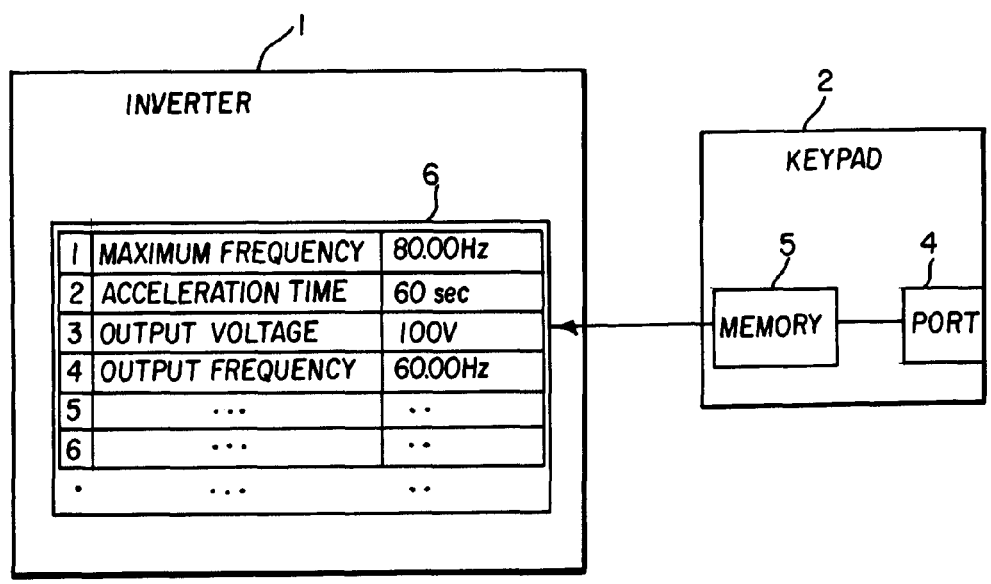
FIG. 3(c) is a drawing schematically describing the data transfer such as parameter transfer from the keypad to the inverter.
Figure 4:
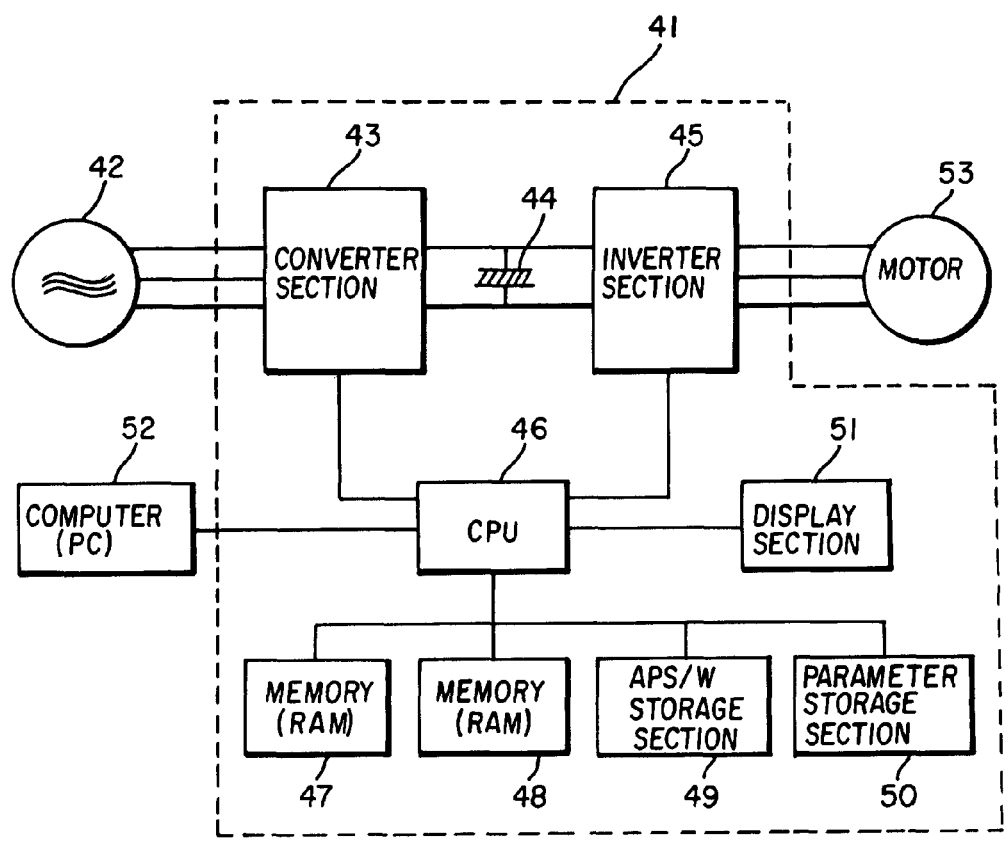
FIG. 4 is a block diagram describing the configuration of a conventional inverter.

FIG. 2(a) is a block diagram describing the operation writing the settings of an inverter into the memory of a keypad from a personal computer (PC) connected to the keypad. FIG. 2(b) is a block diagram describing the operation writing the settings of the inverter into the memory thereof from the keypad connected to the inverter. FIG. 3(a) schematically shows a screen on the PC displaying an example of settings. FIG. 3(b) schematically shows the external appearance of the keypad. FIG. 3(c) is a drawing schematically describing the data transfer such as parameter transfer from the keypad to the inverter.

Referring now to FIG. 2(a), a user such as an installation manager detaches keypad 2 from inverter 1 and connects keypad 2 to personal computer (PC) 3 in a place suited for conducting the setting operation. The user sets the operations of inverter 1 using the application software on PC 3 for setting the operations of inverter 1. FIG. 3(a) shows a screen on PC 3 displaying an example of the settings. In FIG. 3(a), the operation parameter settings of inverter 1 are displayed on the screen exemplary. The user inputs the parameters related to the operations of inverter 1 into blank spaces 31 in the form of numerical values from the input means such as the keyboard and the mouse of PC 3, and presses write button 34. By the operation, the designated parameters and control programs are stored in memory 5 in keypad 2 from PC 3 via communication port 4. As far as PC 3 and keypad 2 are connected to each other, an electric power supply is fed from PC 3 to keypad 2 via communication port 4.

Then, the user mounts keypad 2 on inverter 1 as described in FIG. 2(b) and presses write button 34 or program button 35 shown in FIG. 3(b) on keypad 2. As write button 34 or program button 35 is pressed, the data stored in memory 5 of keypad 2 is transferred to memory 6 of inverter 1 and written therein. FIG. 3(c) describes the parameter values transferred to memory 6 and written therein exemplary but in detail. Inverter 1 operates based on the parameter values and the control programs written in memory 6.

Since keypad 2 is detachable from inverter 1, it is possible to connect keypad 2 to inverters 1 and to copy the same settings to different inverters 1. Alternatively, it is possible to store different settings in memory 5 of keypad 2, to connect keypad 2 to inverters 1 one by one, and to copy the different settings to respective inverters 1. Thus, it is possible to use one single keypad 2 for multiple inverters 1.

As described above, the control apparatus such as an inverter according to the invention includes a detachable keypad including a communication means that facilitates communicating between the keypad and a PC. The settings for the control apparatus are conducted by detaching the keypad from the control apparatus and in a different place different from the place, therein the control apparatus is installed. Then, the keypad is returned to the inverter and the inverter conducts control operations based on the setting contents set in the keypad. Since it is possible for the user such as an installation manager to conduct the setting operation in the place suited for conducting the setting operation, the setting operation efficiency is improved. Although it has been necessary to feed an electric power supply to the entire control apparatus during the setting operation of the conventional control apparatus, it is not necessary to feed the electric power supply to the entire control apparatus during the setting operation of the control apparatus according to the invention, since the keypad is detached from the control apparatus during the setting operation conducted from the PC according to the invention. Moreover, since the keypad is structured such that a power supply is fed from the PC to the keypad according to the invention, it is not necessary for the keypad to have any power supply equipment such as a power supply plug.

Although the invention has been described so far in connection with the embodiment of a control apparatus, the subject matter of the invention is not limited by the specific descriptions herein. For example, although the inverter and the keypad are separated from each other and the setting operation is conducted in the place different from the place, therein the inverter is installed, the setting operation may be conducted from a PC connected to the keypad mounted on the inverter with no problem. In this case, it is not necessary to feed an electric power supply to the inverter during the setting operation, since the electric power supply is fed from the PC to the keypad. Although the invention has been described in connection with the setting of the parameters relevant to the operations of the inverter, the invention is applicable to transferring the control programs of the inverter. Also, although separate memories are described for the keypad and the control apparatus, it is possible to utilize a single memory device in the keypad to store the data which would be accessible by the control apparatus. Thus, changes and modifications are obvious to those skilled in the art without departing from the spirit and the scope of the invention.

What is claimed is:

1. A control apparatus comprising:
   an inverter including a converter section that converts an AC electric power fed from an AC electric power supply to DC electric power, a smoothing capacitor that smoothes the DC electric power, and an inverter section that converts the smoothed DC electric power to AC electric;
   a control apparatus structure that includes a place for installing a detachable keypad therein;
   a keypad, including a keypad body, wherein the keypad body is configured to be physically detachably installed within a recess in the place provided in the control apparatus structure, the place provided in the control apparatus structure also including a connector for connecting to the keypad, wherein the keypad includes one or more control buttons and a communication device that is configured to connect to a computer when the keypad is detached from the control apparatus structure; and
   a keypad storage device provided in the keypad that stores data relevant to operations of the control apparatus, the data comprising parameters values and programs;
   wherein the control buttons on the keypad are configured to be accessed and operable when the keypad is installed within the place provided in the control apparatus structure.

2. The control apparatus according to claim 1, wherein the keypad is detached from the control apparatus and connected to the computer to transfer the data to the keypad storage device; and wherein the keypad is returned to the control apparatus to transfer the data from the keypad storage device to a storage device of the control apparatus.

3. The control apparatus according to claim 1, wherein the communication device tests whether communication between the computer and the keypad is normal or not.

4. The control apparatus according to claim 2, wherein the keypad storage device configured to store the data comprising the parameter values and the programs relevant to the operations of a plurality of control apparatuses.

5. The control apparatus according to claim 1, wherein the communication device is configured to exchange data between the computer and the keypad and is configured to feed an electric power supply from the computer to the keypad.

6. A system comprising:
   a plurality of control devices, wherein each control device includes an inverter including a converter section that converts an AC electric power fed from an AC electric power supply to DC electric power, a smoothing capacitor that smoothes the DC electric power, and an inverter section that converts the smoothed DC electric power to AC electric;
   a control device structure that includes a place for installing a detachable keypad therein and a storage device that stores data relevant to operation of the control device; and
   a keypad, including a keypad storage device, the keypad including a keypad body, wherein the keypad body is configured to be physically detachably installed within a recess in the place provided in each of the control device structures, the place provided in the control device structures also including a connector for connecting to the keypad, wherein the keypad includes one or more control buttons and a communication device that is configured to connect to a computer when the keypad is detached from the control device structures; and
   wherein the control buttons on the keypad are configured to be accessed and operable when the keypad is installed within the place provided in each of the control device structures;
   wherein the keypad is detachable from the control devices and connectable to the computer to transfer the data to the keypad storage device; and
   wherein the keypad is installable to each of the control devices to transfer the data from the keypad storage device to the storage device of each of the control devices.

7. The system according to claim 6, wherein the communication device tests whether communication between the computer and the keypad is normal or not.

8. The system according to claim 6, wherein the keypad storage device is configured to store the data comprising the parameter values and the programs relevant to the operations of the plurality of control devices.

9. The system according to claim 6, wherein the communication device is configured to exchange data between the computer and the keypad and is capable of feeding an electric power supply from the computer to the keypad.

10. The system according to claim 6, wherein the control devices each comprise an inverter including a converter section that converts an AC electric power fed from an AC electric power supply to DC electric power, a smoothing capacitor that smoothes the DC electric power, and an inverter section that converts the smoothed DC electric power to AC electric.

11. A method of operating a control device comprising:
    providing a control device, wherein the control device includes an inverter including a converter section that converts an AC electric power fed from an AC electric power supply to DC electric power, a smoothing capacitor that smoothes the DC electric power, and an inverter section that converts the smoothed DC electric power to AC electric, and a control device structure that includes a place for installing a detachable keypad therein and a storage device that stores data relevant to operation of the control device;

providing a keypad, including a keypad storage device, the keypad including a keypad body, wherein the keypad body is configured to be physically detachably installed within a recess in the place provided in the control device structure, the place provided in the control apparatus structure also including a connector for connecting to the keypad, wherein the keypad includes one or more control buttons and a communication device that is configured to connect to a computer when the keypad is detached from the control device structure; and connecting the keypad to the computer to transfer the data from the computer to the keypad storage device; and disconnecting the keypad from the computer and installing the keypad into the place provided in the control device structure of the control device, such that the control buttons on the keypad is configured to be accessed and operable; and transferring, by using the control buttons on the keypad, the data from the keypad storage device of the keypad to the control device.

* * * * *